Dec. 30, 1924.

H. L. LATIMER

DISAPPEARING MIRROR FOR MOTOR VEHICLES

Filed March 29, 1923

1,521,378

Inventor
Homer L. Latimer
by Hazard and Miller
Att'ys

Patented Dec. 30, 1924.

1,521,378

UNITED STATES PATENT OFFICE.

HOMER L. LATIMER, OF WHITTIER, CALIFORNIA.

DISAPPEARING MIRROR FOR MOTOR VEHICLES.

Application filed March 29, 1923. Serial No. 628,410.

*To all whom it may concern:*

Be it known that I, HOMER L. LATIMER, a citizen of the United States, residing at Whittier, in the county of Los Angeles and State of California, have invented new and useful Improvements in Disappearing Mirrors for Motor Vehicles, of which the following is a specification.

This invention relates to vehicle accessories, and has for an object to provide a disappearing toilet mirror for motor vehicles.

An object of the invention is to provide a toilet mirror that may be readily installed in the top of a motor vehicle and that may be readily shifted to various positions transversely under the top. Another object is to provide means for automatically swinging the mirror to a position out of use, and in which position it will be cleared from the driver's and passengers' view through the front wind shield.

An object is to provide means for automatically throwing the mirror to a position out of the way at any of its positions along a supporting means in the top of an automobile.

Other objects and advantages will be made manifest in the following specification of an embodiment of the invention illustrated in the accompanying drawings, wherein—

Figure 1:
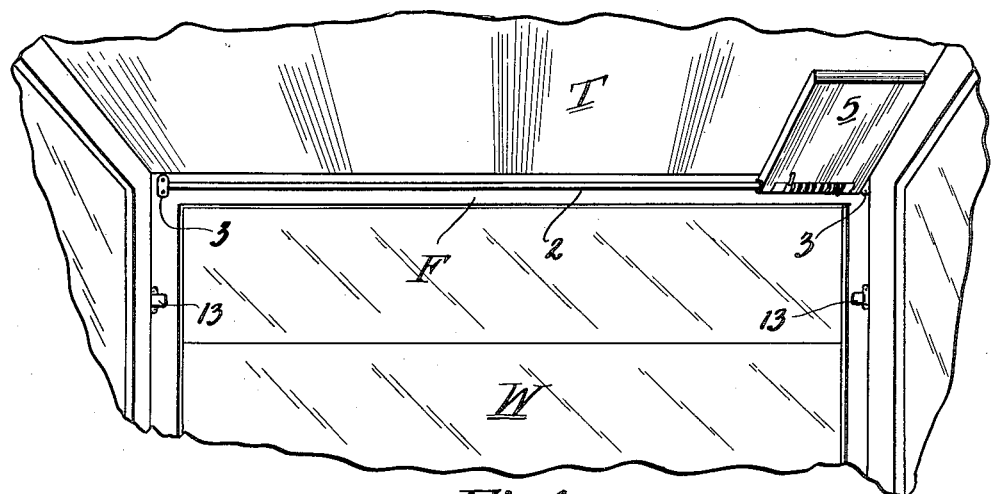
Figure 1 is a perspective, looking forward toward the front wind shield or under-surface of the top of a vehicle; showing the toilet mirror in its normal position out of use.

The present accessory is shown as including a supporting rail or bar 2, preferably of non-circular cross section, and mounted in spaced position in front of a top element of an automobile to which the rail is secured as by end brackets 3. Preferably, the rail is supported by attachment to a frame F of a front wind shield of a portion of the top T of an automobile.

Slidably and turnably mounted upon the rail 2 is a mirror 5, which may be provided with a suitable frame 6, and this is provided with bearings or journal parts 7, which, in the present case, are shown as arranged at upper corners of the mirror frame 6. In the bearing parts 7 are received cylindrical trunnions 8 of a slide 9, which is slidably mounted on the rail 2 but is prevented from rotation thereon. In the present case, the rail is shown as of rectangular cross section, and the slide 9 has rectangular apertures 10 receiving the rail and therefore permitting the slide to be shifted along the rail without rotation thereon.

Figures 2, 3, 4:
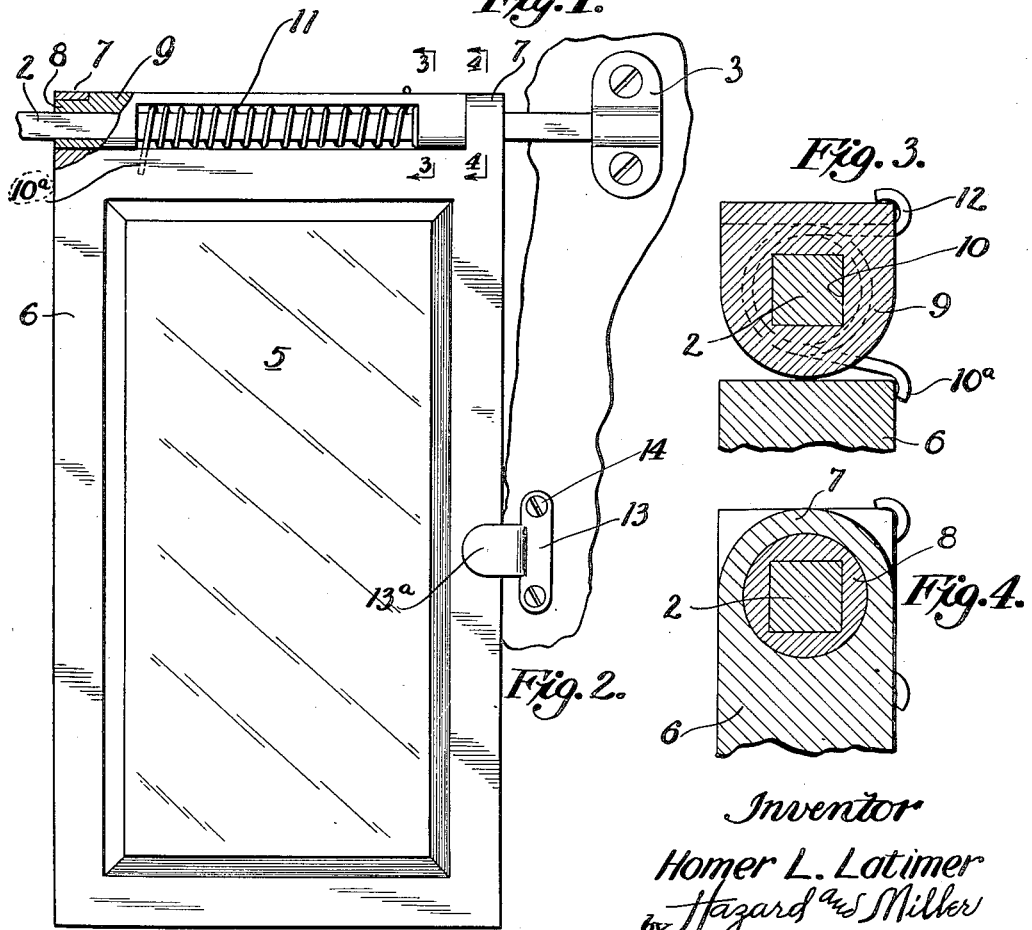
Fig. 2 is a front elevation of the mirror moved down and locked in its useful position; parts being in section.
Fig. 3 is a transverse section on line 3—3 of Figure 2.
Fig. 4 is a transverse section on line 4—4 of Figure 2.

Means are provided for normally holding the mirror in an out-of-the-way position, as up under the top T of an automobile, Figure 1; such means also being operative to automatically throw the mirror to the upper position. Such means is here shown as including a helical spring 11, which may be received in the recessed side of the slide 9: one end of the spring being in fixed engagement, as by hook portion 12, with the slide, while the opposite end 10ª of the Figure 3, is in engagement with the mirror spring frame 6, so that, when the sping is placed under sufficient twisting tension, it will react on the mirror to throw this from a vertical position below the rail 2 to an uppermost and approximately horizontal position beneath the top T.

Means are provided for temporarily holding the mirror in a substantially vertical position for use in making the toilet, and such means is shown as comprising cleat-like devices 13, which may be fastened as by screws 14 to fixed top parts. The cleats 13 have laterally extending claw or finger parts 13ª, under which the edge of the frame 6 of the mirror may be pushed after the mirror has been pulled down to a position convenient for use.

From the above it will be seen that I have provided a toilet mirror that may be readily installed without skill and without requiring any material change or alteration in the top parts of a vehicle, and which mirror can be shifted transversely as to the top for use by occupants of the front or other seats of the vehicle, and have further provided means for automatically throwing the mirror to a position out of forward view through the wind shield W, and in such an inconspicuous position that it is practically unnoticeable.

Further embodiments, modifications and variations may be resorted to within the principle of the invention.

What is claimed is:

1. A disappearing mirror for motor vehicles comprising a supporting rail, brackets adapted to secure the supporting rail to a desired part of a motor vehicle and hold the rail against rotation, a slide slidably and non-rotatably mounted upon the supporting rail and having trunnions at its ends, bearing parts rotatably mounted upon the trunnions, a mirror frame rigid with the bearing parts, a mirror in the mirror frame, there being a cut away portion between the ends of the slide, a coil spring upon the supporting rail in the cut away portion, one end of the spring being connected to the slide and the other end of the spring being connected to the mirror frame, the tension of the spring being exerted to throw the mirror frame upwardly, and means having a finger to engage the mirror frame, the means being adapted for attachment to the vehicle in a substantially vertical plane below the supporting rail, so that the mirror may be pulled downwardly and pushed laterally back of the finger to hold the mirror for use and the mirror may be pulled out of engagement with the finger and allowed to swing upwardly out of use.

2. A disappearing mirror for motor vehicles comprising a supporting rail adapted to reach across a motor vehicle above the windshield glass, means for attaching the ends of the supporting rail to the windshield frame and holding the rail against rotation, a slide slidably and non-rotatably mounted upon the supporting rail and having trunnions at its ends, bearing parts rotatably mounted upon the trunnions, a mirror frame rigid with the bearing parts, a mirror in the mirror frame, there being a cut away portion between the ends of the slide, a coil spring upon the supporting rail in the cut away portion, one end of the spring being connected to the slide and the other end of the spring being connected to the mirror frame, the tension of the spring being exerted to throw the mirror frame upwardly, and attaching means adapted to be secured to the sides of the windshield frame below the ends of the supporting rail and having fingers projecting inwardly, so that the mirror may be moved to either end of the supporting rail and pulled downwardly and pushed behind a finger to hold the mirror for use and then pulled out of engagement with the finger and allowed to swing upwardly out of use or moved to the other end of the supporting rail and pulled downwardly and pushed behind the other finger for use.

In testimony whereof I have signed my name to this specification.

HOMER L. LATIMER.